United States Patent
Gurindapalli et al.

(10) Patent No.: US 11,068,196 B2
(45) Date of Patent: Jul. 20, 2021

(54) SYSTEM AND METHOD FOR A RESTORATION OF ON-PREMISE BACKUPS TO A CLOUD-BASED SERVICE

(71) Applicant: EMC IP Holding Company LLC, Hopkinton, MA (US)

(72) Inventors: Aneesh Kumar Gurindapalli, Vijayawada (IN); Deepthi Urs, Bangalore (IN); Mahesh Reddy Appireddygari Venkataramana, Bangalore (IN); Swaroop Shankar DH, Benares (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 16/662,613

(22) Filed: Oct. 24, 2019

(65) Prior Publication Data
US 2021/0124493 A1    Apr. 29, 2021

(51) Int. Cl.
*G06F 3/06* (2006.01)
*H04L 29/08* (2006.01)

(52) U.S. Cl.
CPC .............. *G06F 3/065* (2013.01); *G06F 3/067* (2013.01); *G06F 3/0619* (2013.01); *G06F 3/0661* (2013.01); *H04L 67/10* (2013.01)

(58) Field of Classification Search
CPC ...... G06F 3/065; G06F 3/0619; G06F 3/0661; G06F 3/067
USPC ....................................................... 711/162
See application file for complete search history.

(56) References Cited

U.S. PATENT DOCUMENTS

| | | | | |
|---|---|---|---|---|
| 6,366,987 B1* | 4/2002 | Tzelnic | ............... | G06F 11/1451 711/112 |
| 6,505,216 B1* | 1/2003 | Schutzman | ......... | G06F 11/1456 |
| 6,865,655 B1* | 3/2005 | Andersen | ............ | G06F 11/1453 707/999.202 |
| 6,912,630 B1* | 6/2005 | Pillai | ................... | G06F 11/1451 707/999.202 |
| 7,937,547 B2* | 5/2011 | Liu | ......................... | G06F 12/16 711/162 |
| 8,190,836 B1* | 5/2012 | Zheng | .................. | G06F 3/0641 711/162 |
| 8,200,638 B1* | 6/2012 | Zheng | ................. | G06F 11/1464 707/679 |

(Continued)

*Primary Examiner* — Christopher B Shin
(74) *Attorney, Agent, or Firm* — Chamberlain, Hrdlicka, White, Williams & Aughtry (57) ABSTRACT

A method for performing a backup operation includes obtaining a restoration request, and in response to the restoration request: identifying a first set of backups, wherein each backup in the first set of backups is associated with requested data, mounting the first set of backups from the backup storage system, performing data mining on the first set of backups to obtain a hierarchical structure, providing a set of options to a client based on the hierarchical structure, obtaining a selection from the client, wherein the selection is a portion of the set of options, obtaining selected content based on the selection, wherein the selected content is in a source format, converting the selected content from a source format to a target format to obtain target formatted user-specified content, and initiating a transfer of the target-formatted user-specified content to a cloud-based service.

20 Claims, 5 Drawing Sheets

(56) References Cited

U.S. PATENT DOCUMENTS

| | | | | |
|---|---|---|---|---|
| 8,281,143 | B1* | 10/2012 | Clifford | G06F 21/6218 |
| | | | | 713/179 |
| 8,375,005 | B1* | 2/2013 | Claudatos | G06F 16/13 |
| | | | | 707/654 |
| 8,756,197 | B1* | 6/2014 | Wilde | G06F 17/00 |
| | | | | 707/640 |
| 9,009,114 | B1* | 4/2015 | Sridharan | G06F 16/1873 |
| | | | | 707/646 |
| 9,189,345 | B1* | 11/2015 | Khanduja | G06F 11/1469 |
| 9,542,397 | B1* | 1/2017 | Graham | G06F 11/1469 |
| 9,690,670 | B1* | 6/2017 | Paulzagade | G06F 11/1464 |
| 9,852,026 | B2* | 12/2017 | Mitkar | G06F 11/1451 |
| 9,971,797 | B1* | 5/2018 | Kumar | G06F 11/1448 |
| 10,235,292 | B2* | 3/2019 | Hakimi | G06F 12/0864 |
| 2008/0307175 | A1* | 12/2008 | Hart | G06F 11/1458 |
| | | | | 711/162 |
| 2018/0284986 | A1* | 10/2018 | Bhagi | G06F 11/2056 |
| 2018/0285202 | A1* | 10/2018 | Bhagi | G06F 16/27 |
| 2020/0012567 | A1* | 1/2020 | Ou | G06F 11/1448 |
| 2020/0241973 | A1* | 7/2020 | Yadav | G06F 11/1464 |
| 2020/0341638 | A1* | 10/2020 | Anand | G06F 3/0619 |
| 2021/0019059 | A1* | 1/2021 | Bhagi | G06F 3/065 |

* cited by examiner

SYSTEM AND METHOD FOR A RESTORATION OF ON-PREMISE BACKUPS TO A CLOUD-BASED SERVICE

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a restoration agent, a restoration request, wherein the restoration request specifies requested data for a user, and in response to the restoration request: identifying a first set of backups, wherein each backup in the first set of backups is associated with the requested data, mounting the first set of backups from the backup storage system, performing data mining on the first set of backups in response to the mounting to obtain a hierarchical structure, providing a set of options to a client based on the hierarchical structure, obtaining a selection from the client, wherein the selection is a portion of the set of options, obtaining selected content based on the selection, wherein the selected content is in a source format, converting the selected content from a source format to a target format to obtain target formatted user-specified content, and initiating a transfer of the target-formatted user-specified content to a cloud-based service.

In general, in one aspect, the invention relates to a system that includes a processor and memory that includes instructions, which, when executed by the processor, perform a method. The method includes obtaining a restoration request, wherein the restoration request specifies requested data for a user, and in response to the restoration request: identifying a first set of backups, wherein each backup in the first set of backups is associated with the requested data, mounting the first set of backups from the backup storage system, performing data mining on the first set of backups in response to the mounting to obtain a hierarchical structure, providing a set of options to a client based on the hierarchical structure, obtaining a selection from the client, wherein the selection is a portion of the set of options, obtaining selected content based on the selection, wherein the selected content is in a source format, converting the selected content from a source format to a target format to obtain target formatted user-specified content, and initiating a transfer of the target-formatted user-specified content to a cloud-based service.

In general, in one aspect, the invention relates to a non-transitory computer readable medium comprising computer readable program code, which when executed by a computer processor enables the computer processor to perform a method for performing a backup operation. The method includes obtaining, by a restoration agent, a restoration request, wherein the restoration request specifies requested data for a user, and in response to the restoration request: identifying a first set of backups, wherein each backup in the first set of backups is associated with the requested data, mounting the first set of backups from the backup storage system, performing data mining on the first set of backups in response to the mounting to obtain a hierarchical structure, providing a set of options to a client based on the hierarchical structure, obtaining a selection from the client, wherein the selection is a portion of the set of options, obtaining selected content based on the selection, wherein the selected content is in a source format, converting the selected content from a source format to a target format to obtain target formatted user-specified content, and initiating a transfer of the target-formatted user-specified content to a cloud-based service.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relate to performing a restoration of user-specified content from an on-premise data system to a cloud-based service. Embodiments of the invention may relate to obtaining backups associated with the on-premise data (i.e., the user-specified content) and transferring the backups to the cloud-based service using a restoration agent. The restoration agent may provide an administrator a set of options for restoring the data and obtain a selection from the administrator. The data associated with the selection may be obtained from a backup storage system storing the backups. The data may be converted from a source format to a target format and transferred to the cloud service and associated with the corresponding user.

Figure 1:
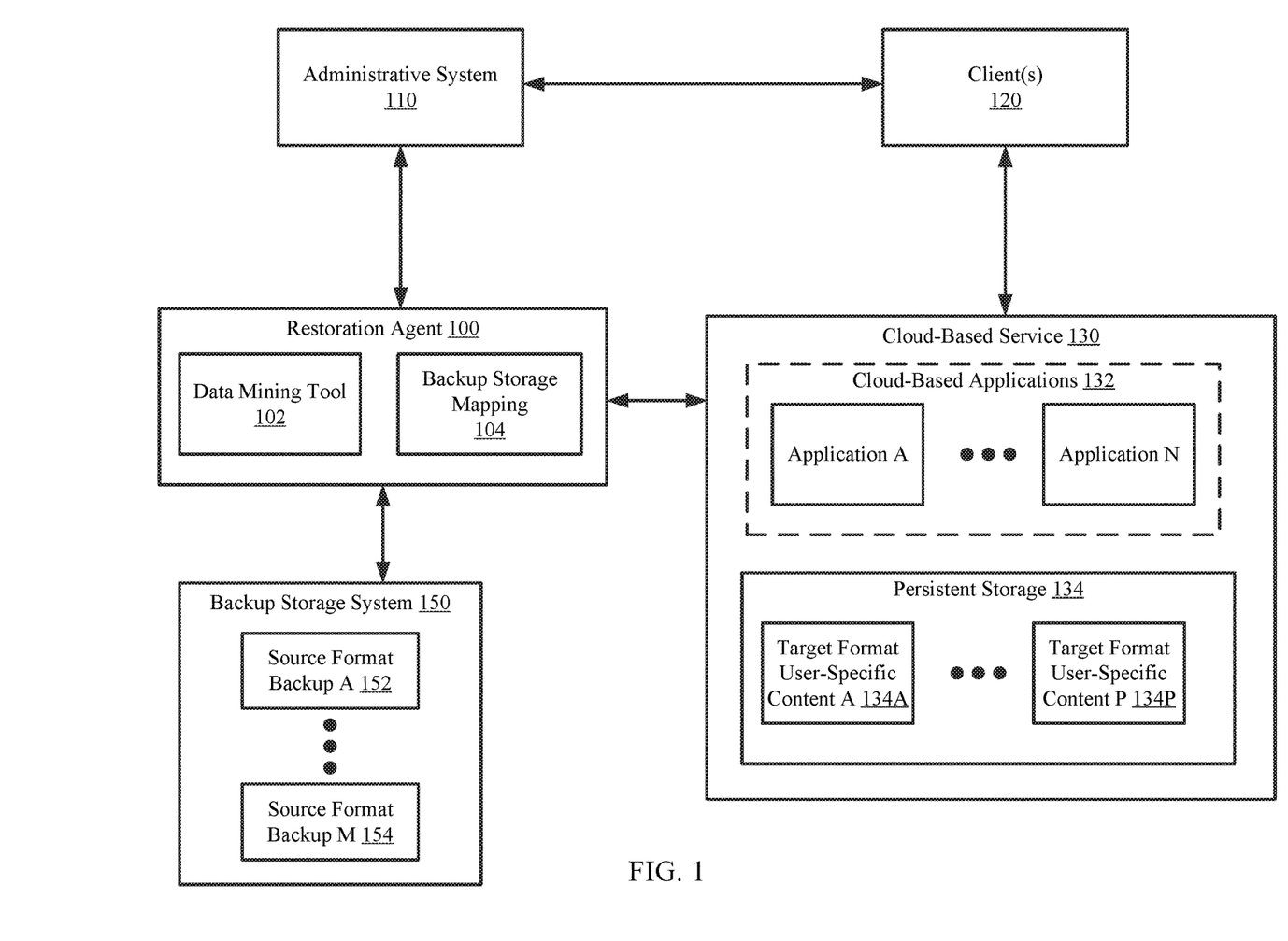
FIG. 1 shows a diagram of a system in accordance with one or more embodiments of the invention.

FIG. 1 shows a diagram of a system in accordance with one or more embodiments of the invention. The system may include one or more clients (120), an administrative system (110), a restoration agent (100), a backup storage system (150), and a cloud-based service (130). The system may include additional, fewer, and/or different components without departing from the invention. Each component may be operably connected to any of the other components via any combination of wired and/or wireless connections. Each of the aforementioned components is discussed below.

In one or more embodiments of the invention, the restoration agent (100) initiates the restoration of user-specified content to the cloud-based service (130). The restoration agent (100) may include a data mining tool (102) and a backup storage mapping (104). The restoration agent (100) may include additional, fewer, and/or different components without departing from the invention.

In one or more embodiments of the invention, the data mining tool (102) analyzes the backups stored in the backup storage system (150) to identify the hierarchical structure of the user-specified content stored in the backup storage system. The data mining tool (102) may implement application programming interface (API) commands to the backup storage system (150) when performing the aforementioned analysis.

Figure 2:
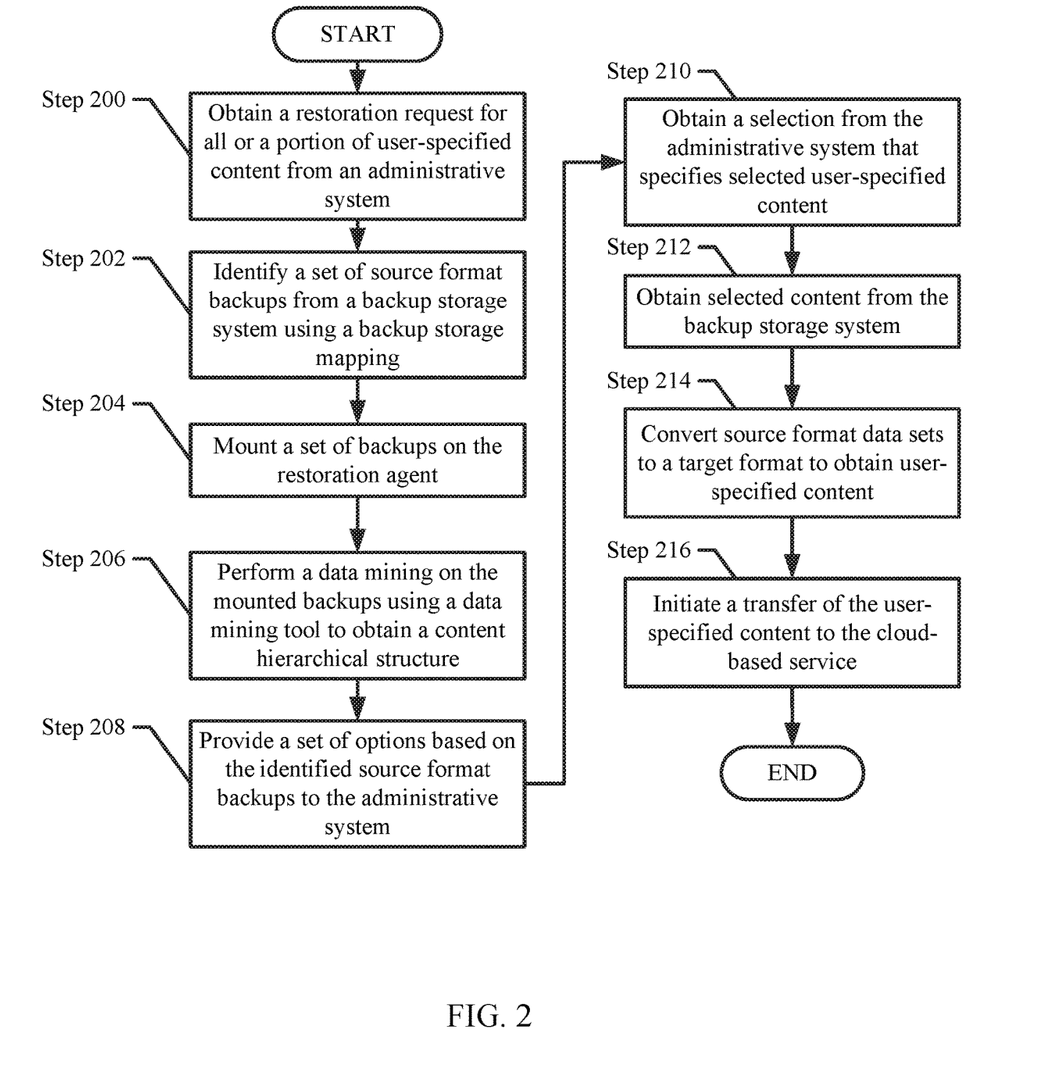
FIG. 2 shows a flowchart for servicing restoration requests in accordance with one or more embodiments of the invention.

In one or more of embodiments of the invention, the data mining tool (102) is implemented as computer instructions, e.g., computer code, stored on a persistent storage that when executed by a processor of the restoration agent (100) cause the restoration agent (100) to provide the functionality of the data mining tool (102) described throughout this application and/or all, or a portion thereof, of the method illustrated in FIG. 2.

In one or more embodiments of the invention, the backup storage mapping (104) is a data structure that maps a source format of data to a target format of data. The backup storage mapping may specify the encoding information associated with a source format and the mapping of that encoding information to encoding information in a target format. In this manner, the backup storage mapping (104) enables the restoration agent (100) to convert data stored in a source format to a target format.

For example, a source format may be in an Exchange database (.edb) format and a target format may be in an electronic mail (.eml) format. The backup storage mapping (104) may specify the internal structure of data in the .edb format and map it to the internal structure of the .eml format. The invention is not limited to the aforementioned formats.

Figure 4:
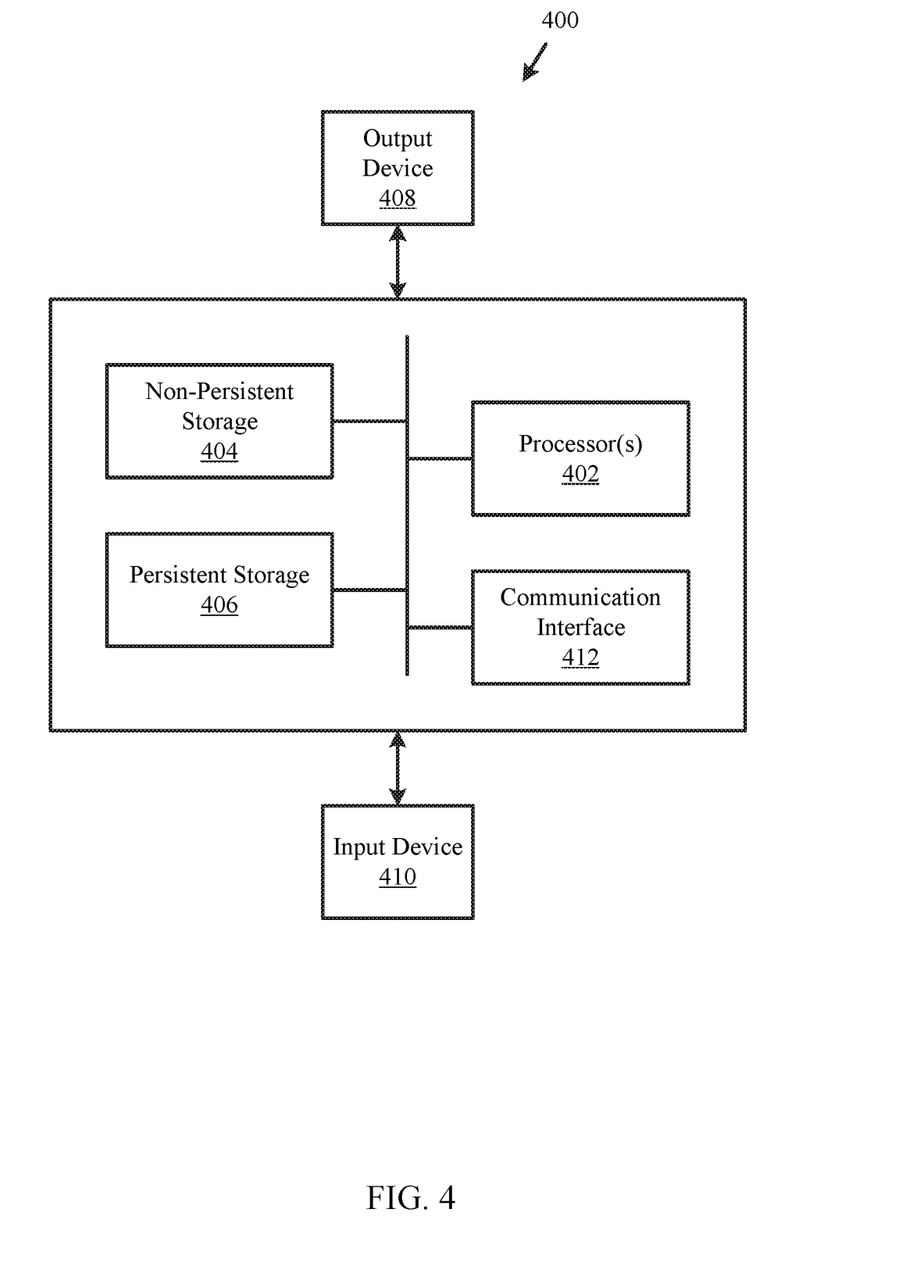
FIG. 4 shows a diagram of a computing device in accordance with one or more embodiments of the invention.

In one or more embodiments of the invention, the restoration agent (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the restoration agent (100) described throughout this application and/or all, or a portion thereof, of the methods illustrated in FIG. 2.

In one or more embodiments of the invention, the restoration agent (100) is implemented as a logical device. The logical device may utilize the computing resources of any number of computing devices and thereby provide the functionality of the restoration agent (100) described throughout this application and/or all, or a portion thereof, of the methods illustrated in FIG. 2.

In one or more embodiments of the invention, the administrative system (110) is operated by one or more administrators that initiate the restoration of the user-specified content. The administrative system (110) may send restoration requests to the restoration agent (100) to restore data to the cloud-based service (130). The restoration requests may be in response to users requesting to restore their data to be accessed from the cloud-based service (130).

In one or more embodiments of the invention, the administrative system (110) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the administrative system (110) described throughout this application.

In one or more embodiments of the invention, the administrative system (110) is implemented as a logical device. The logical device may utilize the computing resources of any number of computing devices and thereby provide the functionality of the administrative system (110) described throughout this application.

In one or more embodiments of the invention, the client(s) (120), operated by users, utilize services provided by the cloud-based service (130) and/or the administrative system (110). Specifically, the client(s) (120) may utilize the applications (132) of the cloud-based service (130) to obtain, modify, and/or store data. Further, the client(s) (120) may utilize the administrative system (110) to initiate a restoration of user-specified content via the restoration agent (100). The administrative system (110) may trigger a restoration performed by the restoration agent (100) by sending a restoration request to the restoration agent (100) that specifies the user-specified content.

In one or more embodiments of the invention, a client (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (120) described throughout this application.

In one or more embodiments of the invention, the client(s) (120) are implemented as a logical device. The logical device may utilize the computing resources of any number of computing devices and thereby provide the functionality of the client(s) (120) described throughout this application.

In one or more embodiments of the invention, the cloud-based service (130) host applications (132) (also referred to as cloud-based applications). The VMs (132) may be logical entities executed using computing resources (not shown) of the production host (130). Each of the applications (132) may be performing similar or different processes. In one or more embodiments of the invention, the applications (132) provide services to users, e.g., clients (120). The applications may be, for example, instances of databases, email servers, and/or other applications without departing from the invention.

In one or more of embodiments of the invention, the applications (132) are implemented as computer instructions, e.g., computer code, stored on a persistent storage (e.g., 134) that when executed by a processor(s) of a computing device (see, e.g., FIG. 4) cause the computing device to provide the functionality of the applications (132) described throughout this application.

In one or more embodiments of the invention, the cloud-based service (130) is implemented as a logical device. The logical device may utilize the computing resources of any number of computing devices and thereby provide the functionality of the cloud-based service (130) described throughout this application.

In one or more embodiments of the invention, the backup storage system (150) store backups of data. The backups (also referred to as source format backups) (152, 154), are stored in a source format. The backup storage system (150) may communicate with the restoration agent (100) when transferring backups to the cloud-based service (130) for restorations of user-specified content. In one or more embodiments of the invention, a backup is a copy of data associated with an application (132) and/or other user-specified content (134A, 134P) of the cloud-based service (130). A backup may further include additional data that enables the restoration agent (100) to restore the data.

In one or more embodiments of the invention, the backups (152, 154) stored in the backup storage system (150) are stored in the source format discussed above. In other words, the internal structure of the data in each of the source format backups (152, 154) are formatted in such a way that the data may be read by a computing device that understands the source format.

In one or more embodiments of the invention, the backup storage system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

FIG. 2 shows a flowchart for restoring user-specified content in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel. The method shown in FIG. 2 may be performed by, for example, a restoration agent (100, FIG. 1). Other components of the system illustrated in FIG. 1 may perform the method of FIG. 2 without departing from the invention.

In step 200, a restoration request is obtained for all or a portion of user-specified content. In one or more embodiments of the invention, the restoration request is obtained from an administrative system. The administrative system, operated by an administrator, may specify in the restoration request a user and/or any data associated with the user that is to be restored by the restoration agent. The data may also be referred to as requested data.

In step 202, a set of source format backups are identified from a backup storage system. In one or more embodiments of the invention, the restoration agent uses a backup storage mapping to identify the backups that may include the requested data. In one embodiment of the invention, the backup storage mapping specifies which backups, e.g., on a per-user basis, are present in the backup storage system. The backups in the backup storage system may each be associated with a user. The restoration agent may identify the backups that are associated with the specified user of the restoration request using the backup storage mapping.

In step 204, an identified set of backups are mounted on the restoration agent. In one or more embodiments of the invention, when the set of backups are mounted a directory associated with the backups is generated such that the restoration agent is able to read, write, and/or otherwise access the identified set of backups from the backup storage system. The restoration agent includes functionality to identify, after the mounting, the source format(s) of the backups and/or any data associated with each backup.

In step 206, data mining is performed on the mounted backups using a data mining tool to obtain a content hierarchical structure. In one or more embodiments of the invention, the data mining tool includes functionality to read the source format backups and to identify a hierarchical structure of each backup in the identified set. The hierarchical structure may specify one or more metadata blocks (e.g., references) that reference and/or are otherwise associated with data blocks and/or other metadata blocks.

In one or more embodiments of the invention, the data mining is performed by sending application programming interface (API) commands to an exposed API of the backup storage system. The exposed API may return responses to the API commands that provide the requested information. The information of the responses may be used to generate the hierarchical structure.

For example, each backup may be a mailbox of the user. Each mailbox may include a set of files in which mail messages are stored. The hierarchical structure may specify the hierarchical structure in which the mailbox(es) of each backup is specified, the files and/or folders of the mailbox(es), and/or the messages associated with each file/folder. The mailbox may include other data and/or metadata without departing from the invention.

In step 208, a set of options are provided to an administrative system. The set of options may be based on the hierarchical structure generated in step 206. The set of options may specify the hierarchical structure and/or any data associated with the hierarchical structure that is available for restoration.

The set of options may be presented in a manner such that the administrative system is able to select all or a portion of the set of options to be restored. The set of options may be presented via, for example, a graphical user interface (GUI). The GUI may enable the administrative system to select the desired data to be restored.

In step 210, a selection is obtained from the administrative system. The selection may specify the user-specified content that the user would like to restore. The selection may specify one or more data blocks, messages, and/or any other portion of data specified by the hierarchical structure.

In step 212, the selected content is obtained from the backup storage system. In one or more embodiments of the invention, the selected content is obtained using the exposed API of the backup storage system. The restoration agent may send API commands to the backup storage system to obtain the specified content based on the hierarchical structure. The specified content may be obtained as source format data sets. The data sets may each be all or a portion of a source format backup.

In step 214, the source format data sets are converted from the source format to a target format. In one or more embodiments of the invention, the data sets are converted using a backup storage mapping. The backup storage mapping may include information that enables the restoration agent to convert the data sets from the source format to the target format. For example, the backup storage mapping specifies a mapping between each entity (e.g., a file, a folder, a mailbox, a metadata field) specified in the source format with an entity in the target format. The result of the conversion, using the backup storage mapping, may be target format data sets (also referred to as target formatted user-specified content).

In step 216, a transfer is initiated of the target formatted user-specified content to the cloud-based service. In one or more embodiments of the invention, the transfer includes sending requests to an API of the cloud-based service to access the persistent storage of the cloud-based service. The requests may specify the user and/or the target formatted user-specified content. The cloud-based service API may perform a verification that enables the cloud-based service to confirm that the restoration agent (on the user's behalf) may initiate the transfer of the target formatted user-specified content. After the transfer is verified, the restoration agent initiates the transfer of the target formatted user-specified content.

In one or more embodiments of the invention, the restoration agent exports the target formatted user-specified content to the cloud-based service. The restoration agent may obtain the confirmation from the cloud-based service and send the target formatted user-specified content in the cloud-based service. The cloud-based service may subsequently store the target formatted user-specified content in the persistent storage of the cloud-based service and associate the target formatted user-specified content to the specified user. In this manner, the user is able to access the target formatted user-specified content from the cloud-based service.

EXAMPLE

Figure 3A:
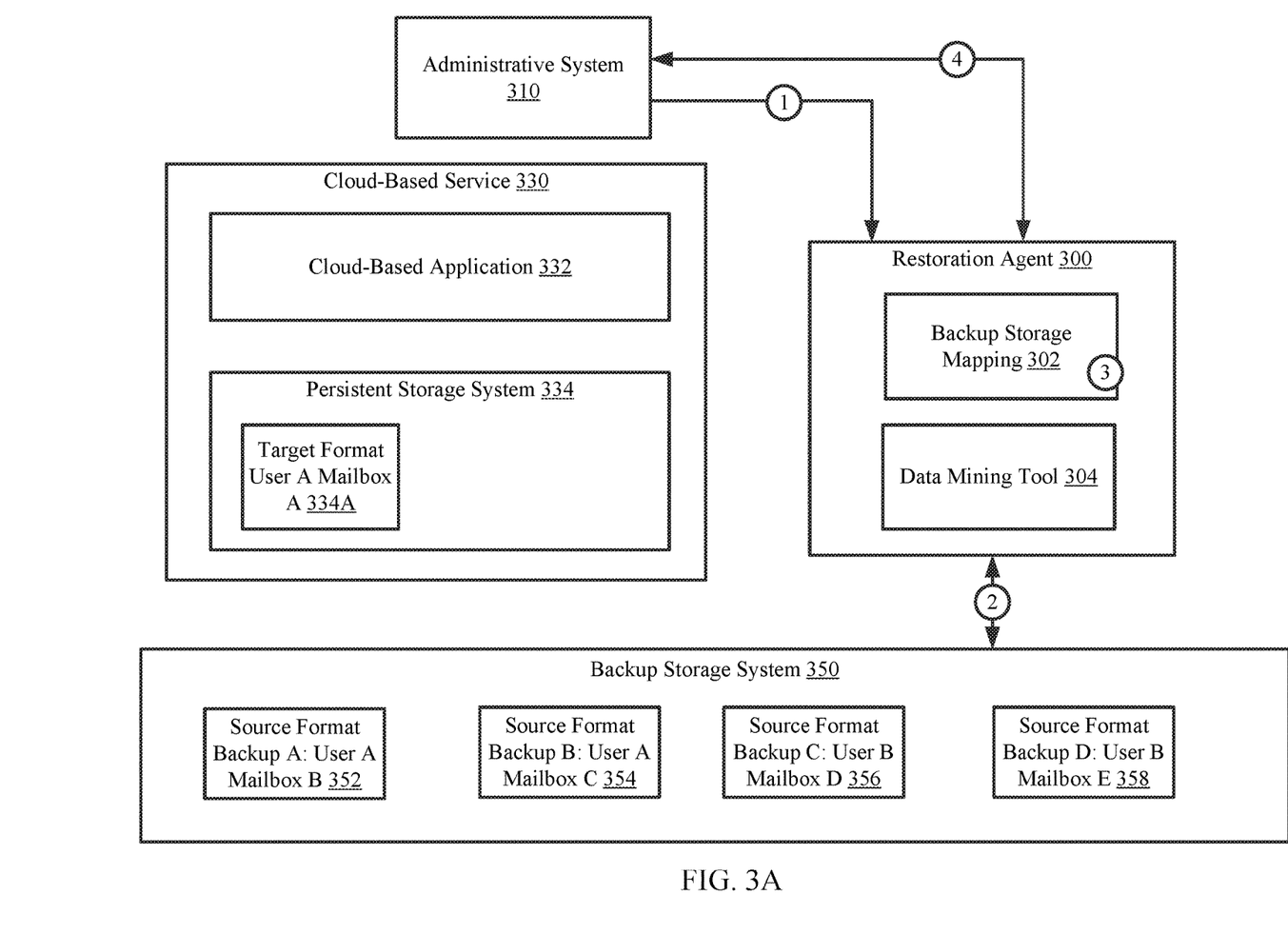
FIGS. 3A-3B show an example in accordance with one or more embodiments of the invention.
Figure 3B:
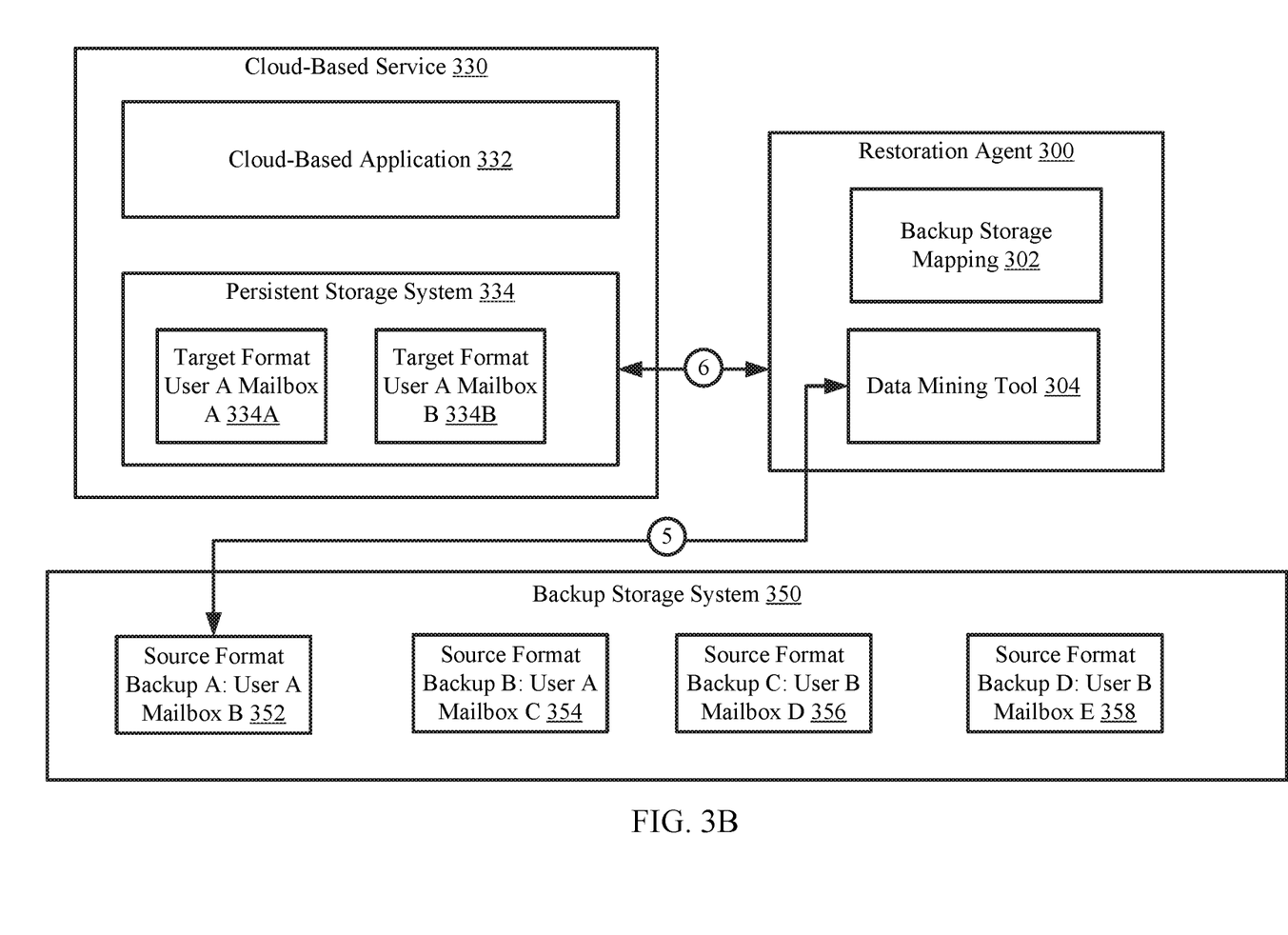

The following section describes an example. The example, illustrated in FIGS. 3A-3B, is not intended to limit the invention. Turning to the example, consider a scenario in which a system is performing a restoration of user-specified content. The system may include a restoration agent (300), an administrative system (310), a cloud-based service (330), and a backup storage system (350). The cloud-based service (330) may include an application (332) and a persistent storage (334) that stores a mailbox (334A) associated with a user A.

The restoration agent (300) obtains a restoration request from the administrative system (310) that specifies content associated with user A [1]. The restoration agent (302) uses a backup storage mapping to identify a set of backups, stored in the backup storage system (350), that are associated with user A. The restoration agent (300) mounts the two backups (352, 354) on the restoration agent (300) [2].

The restoration agent (300) using the mounted backups, performs data mining on the two source format backups (352, 354) to obtain a hierarchical structure of the backups (352, 354) [3]. The hierarchical structure specifies the specific organization of the folders and sub-folders of mailbox A and mailbox B along with which emails are in each of the folders and/or sub-folders.

Based on the generated hierarchical structure, the restoration agent (300) communicates with the administrative system (310) to specify the user-specified content to be restored [4]. Specifically, the restoration agent (300) provides a set of options that specify the content of the hierarchical structure. The set of options may be the mailboxes B and C and the hierarchical structure of each mailbox (which may also show the emails in each of the folders or sub-folders). The administrative system (310) sends a response that specifies restoring a selection that includes all mail messages associated with only mailbox B. Mailbox B is stored in backup A (352).

FIG. 3B shows the example system at a later point in time. The restoration agent (300), in response to the obtained selection, obtains the user-specified content from the backup storage system (350) [5]. Specifically, the restoration agent (300) uses a data mining tool (304) to send API commands to the backup storage system (350) to access the specified user-specified content and temporarily store the content in the restoration agent (300). The restoration agent (300) further uses the backup storage mapping (302) to converts the obtained content from the source format (i.e., .edb) to the target format (i.e., .eml).

After the user-specified content is converted from .edb to .eml, the restoration agent initiates a transfer of the target format user-specified content to the cloud-based service (300) [6]. Specifically, the cloud-based service identifies the user of the mailbox (i.e., user A) and communicates with a client in which user A is operating, obtains confirmation to store the converted content on the cloud-based service. Upon receipt of the confirmation from the user, the restoration agent (300), using one or more APIs provided by the cloud-based service (330), initiates the transfer of the target format user-specified content to the cloud-based service (300).

At a later point in time, not shown in FIGS. 3A-3B, the client operated by user A may access mailbox B (334B) from the cloud-based service (330) via the cloud-based application (332).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of accessing data originally stored in one source format in a cloud-service that accesses data in a target format. Embodiments of the invention may enable a user to access data of an on-premise data environment from a second cloud-based environment. Embodiments of the invention minimize the user effort of accessing user-specified data by restoring the data to one data environment as opposed to relying on access to two separate data environments.

Thus, embodiments of the invention may address the problem of inefficient use of computing resources. This problem arises due to the technological nature of the environment in which data is managed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, the method comprising:
   obtaining, by a restoration agent, a restoration request, wherein the restoration request specifies requested data for a user; and
   in response to the restoration request:
      identifying a first set of backups, wherein each backup in the first set of backups is associated with the requested data;
      mounting the first set of backups from the backup storage system;
      performing data mining on the first set of backups in response to the mounting to obtain a hierarchical structure;
      providing a set of options to a client based on the hierarchical structure;
      obtaining a selection from the client, wherein the selection is a portion of the set of options;
      obtaining selected content based on the selection, wherein the selected content is in a source format;
      converting the selected content from a source format to a target format to obtain target formatted user-specified content; and
      initiating a transfer of the target-formatted user-specified content to a cloud-based service.

2. The method of claim 1, wherein the restoration agent comprises a backup storage mapping and a data mining tool.

3. The method of claim 2, wherein the backup storage mapping specifies a mapping between the source format and the target mapping.

4. The method of claim 1, wherein each backup in the first set of backups is further associated with the user.

5. The method of claim 1, wherein performing the data mining comprises:
   sending application programming interface (API) commands to the backup storage system to access the first set of backups;
   analyzing the first set of backups obtained in response to the API commands; and
   based on the analyzing of the first set of backups, generating the hierarchical structure.

6. The method of claim 1, wherein the hierarchical structure specifies at least the selected content.

7. The method of claim 1, wherein the selected content is a portion of a mailbox.

8. A system, comprising:
   a processor; and
   memory comprising instructions which, when executed by the processor, perform a method, the method comprising:
      obtaining a restoration request, wherein the restoration request specifies requested data for a user; and
      in response to the restoration request:
         identifying a first set of backups, wherein each backup in the first set of backups is associated with the requested data;
         mounting the first set of backups from the backup storage system;
         performing a data mining on the first set of backups in response to the mounting to obtain a hierarchical structure;
         providing a set of options to a client based on the hierarchical structure;

obtaining a selection from the client, wherein the selection is a portion of the set of options;

obtaining selected content based on the selection, wherein the selected content is in a source format;

converting the selected content from a source format to a target format to obtain target format user-specified content; and initiating a transfer of the target-formatted user-specified content to a cloud-based service.

9. The system of claim 8, wherein the restoration agent comprises a backup storage mapping and a data mining tool.

10. The system of claim 9, wherein the backup storage mapping specifies a mapping between the source format and the target mapping.

11. The system of claim 8, wherein each backup in the first set of backups is further associated with the user.

12. The system of claim 8, wherein performing the data mining comprises:

sending application programming interface (API) commands to the backup storage system to access the first set of backups;

analyzing the first set of backups obtained in response to the API commands; and based on the analyzing of the first set of backups, generating the hierarchical structure.

13. The system of claim 8, wherein the hierarchical structure specifies at least the selected content.

14. The system of claim 8, wherein the selected content is a mailbox.

15. A non-transitory computer readable medium comprising computer readable program code, which when executed by a computer processor enables the computer processor to perform a method for performing a backup operation, the method comprising:

obtaining, by a restoration agent, a restoration request, wherein the restoration request specifies requested data for a user; and in response to the restoration request:

identifying a first set of backups, wherein each backup in the first set of backups is associated with the requested data;

mounting the first set of backups from the backup storage system;

performing a data mining on the first set of backups in response to the mounting to obtain a hierarchical structure;

providing a set of options to a client based on the hierarchical structure;

obtaining a selection from the client, wherein the selection is a portion of the set of options;

obtaining selected content based on the selection, wherein the selected content is in a source format;

converting the selected content from a source format to a target format to obtain target formatted user-specified content; and initiating a transfer of the target-formatted user-specified content to a cloud-based service.

16. The non-transitory computer readable medium of claim 15, wherein the restoration agent comprises a backup storage mapping and a data mining tool.

17. The non-transitory computer readable medium of claim 16, wherein the backup storage mapping specifies a mapping between the source format and the target mapping.

18. The non-transitory computer readable medium of claim 15, wherein each backup in the first set of backups is further associated with the user.

19. The non-transitory computer readable medium of claim 15, wherein performing the data mining comprises:

sending application programming interface (API) commands to the backup storage system to access the first set of backups;

analyzing the first set of backups obtained in response to the API commands; and based on the analyzing of the first set of backups, generating the hierarchical structure.

20. The non-transitory computer readable medium of claim 18, wherein the hierarchical structure specifies at least the selected content, and wherein the selected content is a mailbox.

* * * * *